United States Patent [19]
Sawicki

[11] Patent Number: 5,365,379
[45] Date of Patent: Nov. 15, 1994

[54] LASER CORRECTING MIRROR
[75] Inventor: Richard H. Sawicki, Danville, Calif.
[73] Assignee: The United States of America as represented by the United States Department of Energy, Washington, D.C.
[21] Appl. No.: 39,669
[22] Filed: Mar. 30, 1993
[51] Int. Cl.⁵ .................................................. G02B 7/18
[52] U.S. Cl. ...................................... 359/846; 372/99; 359/847; 359/849
[58] Field of Search ...................... 359/846, 847, 849; 372/99

[56] References Cited
U.S. PATENT DOCUMENTS

| | | | |
|---|---|---|---|
| 4,664,488 | 5/1987 | Sawicki et al. ............ | 350/611 |
| 4,664,488 | 3/1987 | Sawicki et al. ............ | 350/611 |

Primary Examiner—Rodney B. Bovernick
Assistant Examiner—Robert E. Wise
Attorney, Agent, or Firm—Miguel A. Valdes; Roger S. Gaither; William R. Moser

[57] ABSTRACT

An improved laser correction mirror (10) for correcting aberrations in a laser beam wavefront having a rectangular mirror body (12) with a plurality of legs (14, 16, 18, 20, 22, 24, 26, 28) arranged into opposing pairs (34, 36, 38, 40) along the long sides (30, 32) of the mirror body (12). Vector force pairs (49, 50, 52, 54) are applied by adjustment mechanisms (42, 44, 46, 48) between members of the opposing pairs (34, 36, 38, 40) for bending a reflective surface 13 of the mirror body 12 into a shape defining a function which can be used to correct for comatic aberrations.

17 Claims, 4 Drawing Sheets

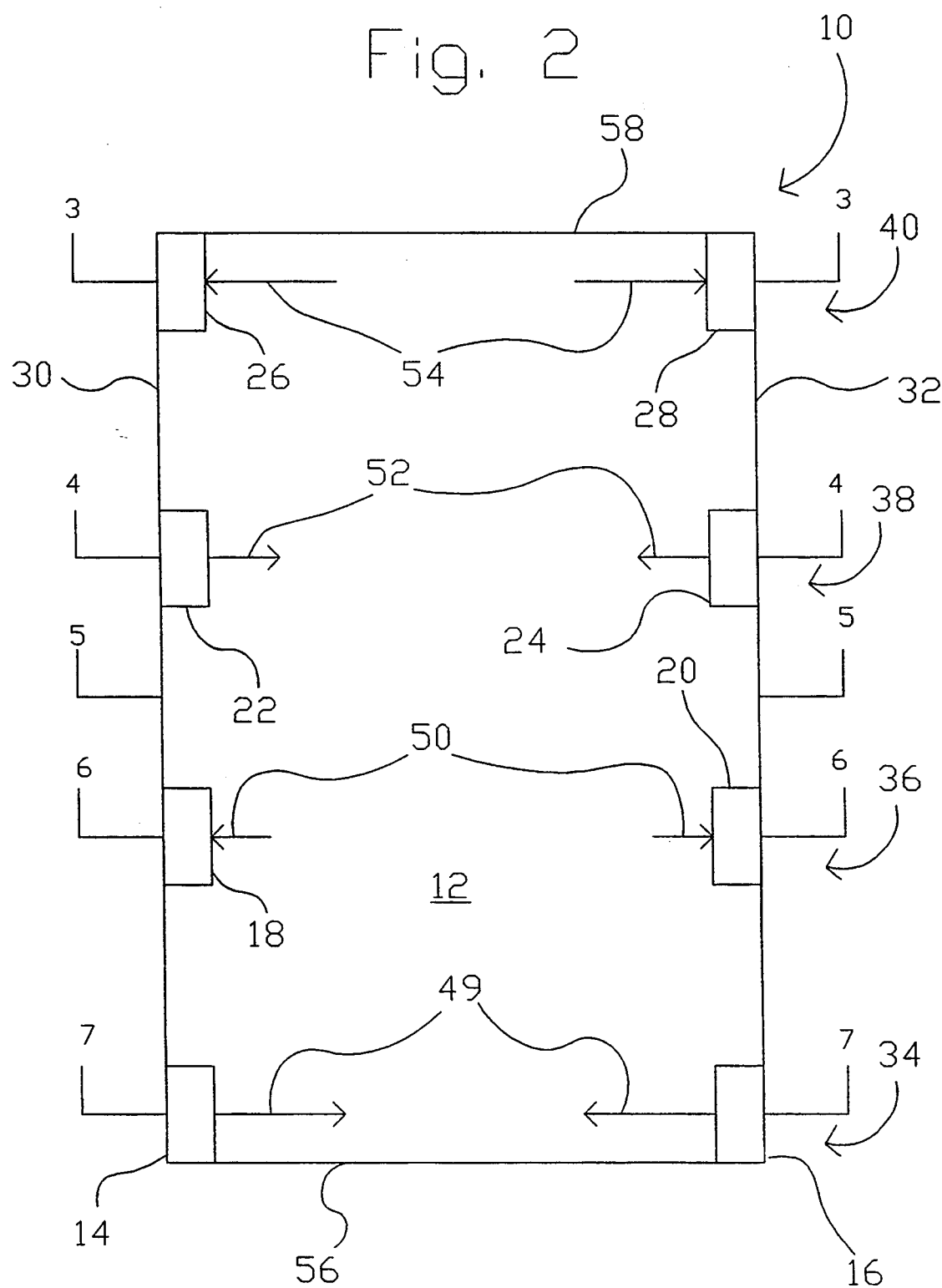

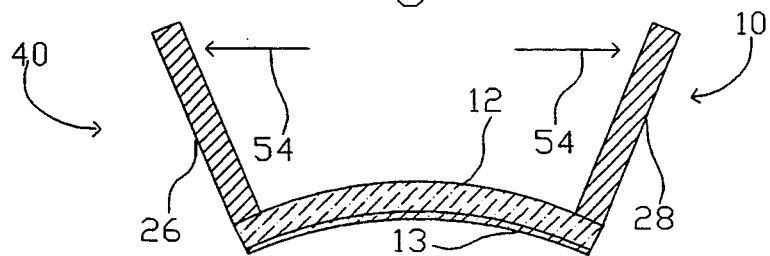
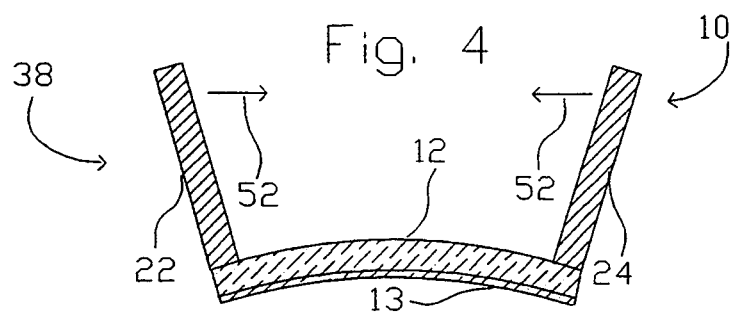
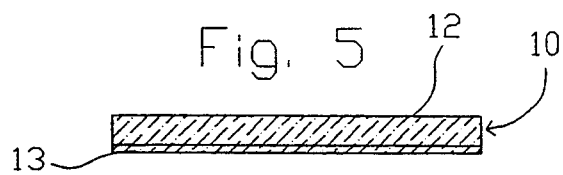
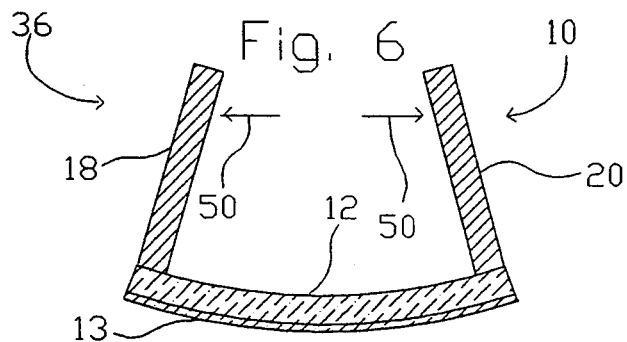
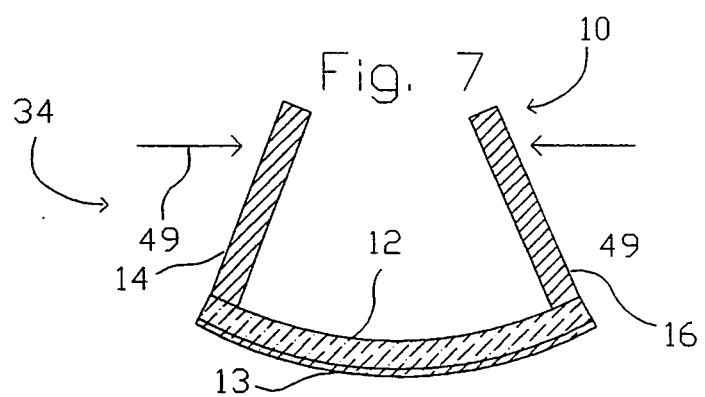

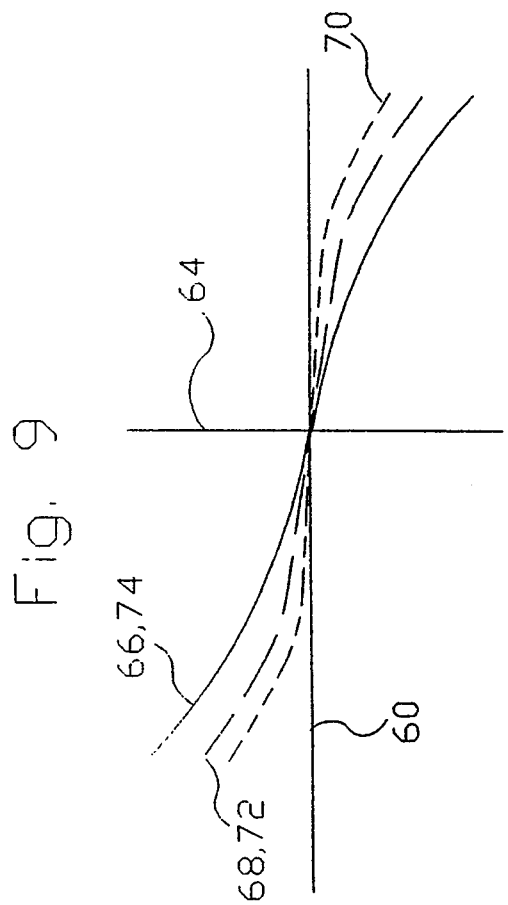
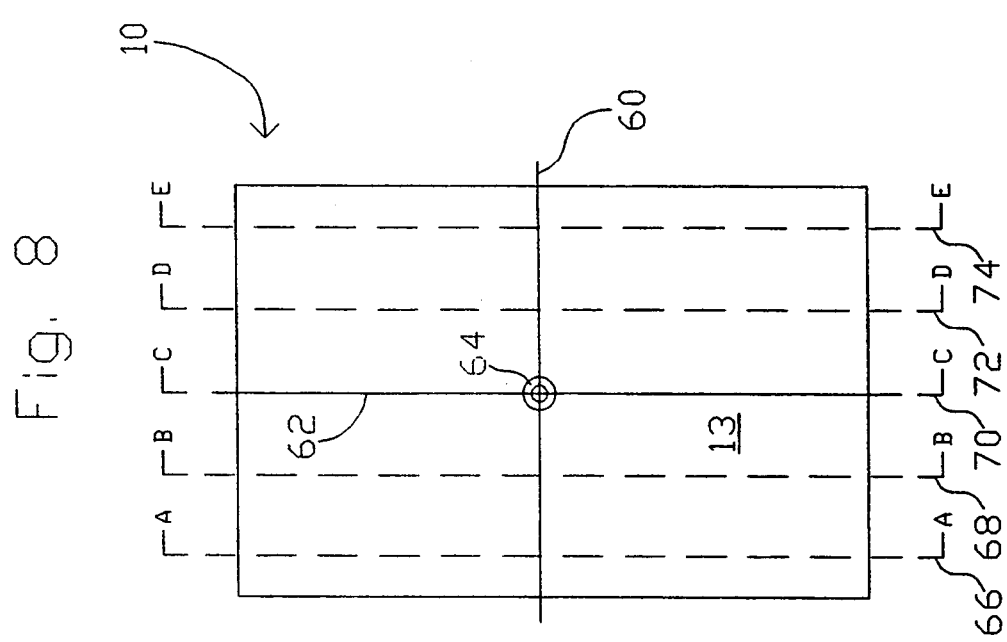

LASER CORRECTING MIRROR

BACKGROUND OF THE INVENTION

The invention described herein arose in the course of, or under, contract No. W-7405-ENG-48 between the United States Department of Energy and the University of California for the operation of Lawrence Livermore National Laboratory.

The present invention relates generally to laser technology and more particularly to a means and method for the correction of laser beam wavefront distortion.

In the processing and projection of laser beams it frequently occurs that an unwanted side effect of such processing is distortion of the wavefront of the laser beam. As one skilled in the art will recognized, this is a generally undesirable condition, since any wavefront form other than perfectly flat will result in distortion of the intensity distribution of the laser beam in the far field. One form of such distortion is astigmatism, and it is known in the art to correct such distortion by causing the laser beam to be projected onto a mirror, which mirror is curved as required to correct the astigmatism. U.S. Pat. No. 4,647,164 issued to the present inventor and William Sweatt has taught a means for variably contouring such a correction mirror so that correction can be made for curvature of higher orders. U.S. Pat. No. 4,664,488, also issued to the present inventor and Sweatt, has taught an improved means for accomplishing the correction of astigmatism in laser beams, which improved means has a bendable mirrored surface with a plurality of legs projecting perpendicularly from the back thereof. As is disclosed in the '488 Patent, the mirrored surface may be controllably distorted by selectively applying forces to the projecting legs, and the means for doing this is described in detail in that Patent.

Despite the improvements in the field relating to the correction of astigmatism in laser beams, the present inventor and others engaged in related pursuits have been concerned that there are other forms of distortion which are commonly introduced onto laser beam wavefronts which are not so easily correctable by any known prior art means. Among these more difficult problems is an optical phenomenon known as COMMon Aberration in laser beams ("COMA"). COMA can be corrected by aspherically manufactured optical elements, but not for an arbitrary magnitude of distortion, which is required in some laser systems. Further, since COMA imparts a form to the laser wavefront having a component which is described by a cubic function, it cannot be corrected by a conventional cylindrically curved mirror.

The invention of the above referenced '488 Patent, in addition to offering the substantial improvement of better controllability in bending mirrors to shapes defined by quadratic functions, attempted to address the problem of bending the mirror into shapes defined by cubic functions. Since it was not thought to be possible to bend a mirror into a shape defined by a cubic function by applying bending forces on the mirror relative only to itself, the '488 Patent disclosed an additional apparatus for applying bending forces on the mirror relative to the apparatus on which the mirror was mounted. This was, at the time, the best known means for attempting to bend a mirror into shapes defined by cubic functions, and it did indeed approximate that result. However, although the rearwardly projecting legs of the '488 Patent have proven to be quite useful, the additional means for applying forces relative to the mirror mounting has been far less than entirely successful. In practice, the additional means for applying forces relative to the mirror mounting has encountered some considerable difficulties, including that it is difficult to precisely control forces on the mirror with it and further in that, in addition to the desired forces, the external mechanism necessarily applies an unwanted force which tends to turn the mirror out of alignment relative to the mounting.

Clearly, it would be advantageous to have a convenient means for producing a mirror which can correct for COMA. Further, it would clearly be advantageous to have a means for producing a COMA correction mirror which is adjustable to suit varying application requirements, much as in the manner of the adjustable mirror taught by the '488 Patent, although without the necessity of applying forces on the mirror relative to its mounting, as was taught by the '488 Patent. However, despite the considerable related developments which have occurred in this field, those skilled in the art have believed that it would not be practical to attempt to deform a flat mirror to a form required to correct for COMA using internal forces only.

No prior art mirror, to the inventor's knowledge, has successfully provided a means for correcting for COMA with the degree of efficiency and precision attainable by the present invention. All prior art means have either required costly mirrors which require complex control systems and/or have provided a less than desirable accuracy of correction. Furthermore, no prior art mirror, to the inventor's knowledge, has provided an adjustable means for correcting for COMA which did not also result in unwanted forces being applied to the mirror relative to its mounting.

SUMMARY OF THE INVENTION

Accordingly, it is an object of the present invention to provide an efficient means for COMA correction.

It is another object of the present invention to provide a COMA correction means which may be adjusted as required for a particular application.

It is still another object of the present invention to provide a COMA correction means which precisely corrects for wave front distortion which is described by the sum of a cubic function ($y^3$) and a function which is quadratic in one direction and linear in the orthogonal direction ($X^2Y$).

It is yet another object of the present invention to provide a COMA correction means which is inexpensive to produce.

It is still another object of the present invention to provide a COMA correction means which will not tend to twist a mirror out of its desired alignment.

Briefly, the preferred embodiment of the present invention is a generally rectangular plate with one surface thereof mirrored. Eight adjustment legs project rearward from the plate, with four of the eight legs placed at regular intervals along each of the long sides of the rectangular plate such that there are four pairs of adjustment legs. The rectangular plate may be distorted somewhat by applying force to opposing pairs of legs relative to the corresponding member of the pair. Forces may be applied either outward (tending to bend the legs apart) or inward (tending to bring the legs together). By selectively applying alternate outward and inward forces to successive pairs of the legs, distortion in the form required for COMA correction.

An advantage of the present invention is that a mirror may be distorted to accurately describe a cubic order function.

A further advantage of the present invention is that COMA may be accurately corrected.

Yet another advantage of the present invention is that it is easy and inexpensive to produce.

Still another advantage of the present invention is that it is adjustable to meet varying application requirements.

Yet another advantage of the present invention is that not external pressure which might tend to push the mirror out of alignment is applied to the mirror.

Still another advantage of the present invention is that only very simple mechanisms are required to apply the necessary forces to the mirror.

These and other objects and advantages of the present invention will become clear to those skilled in the art in view of the description of the best presently known mode of carrying out the invention and the industrial applicability of the preferred embodiment, as described herein and as illustrated in the several figures of the drawing.

BRIEF DESCRIPTION OF THE DRAWING

FIG. 2 is a rear elevational view of the improved laser correction mirror of FIG. 1;

FIG. 3 is a cross sectional view of the improved laser correction mirror taken along line 3—3 of FIG. 2;

FIG. 4 is a cross sectional view of the improved laser correction mirror taken along line 4—4 of FIG. 2;

FIG. 5 is a cross sectional view of the improved laser correction mirror taken along line 5—5 of FIG. 2;

FIG. 6 is a cross sectional view of the improved laser correction mirror taken along line 6—6 of FIG. 2;

FIG. 7 is a cross sectional view of the improved laser correction mirror taken along line 7—7 of FIG. 2;

FIG. 8 is a front elevational view of the improved laser correction mirror showing reference lines superimposed thereon; and FIG. 9 is a graphic representation of an example of the bending function accomplished by the present inventive method.

DETAILED DESCRIPTION OF THE INVENTION

Figure 1:
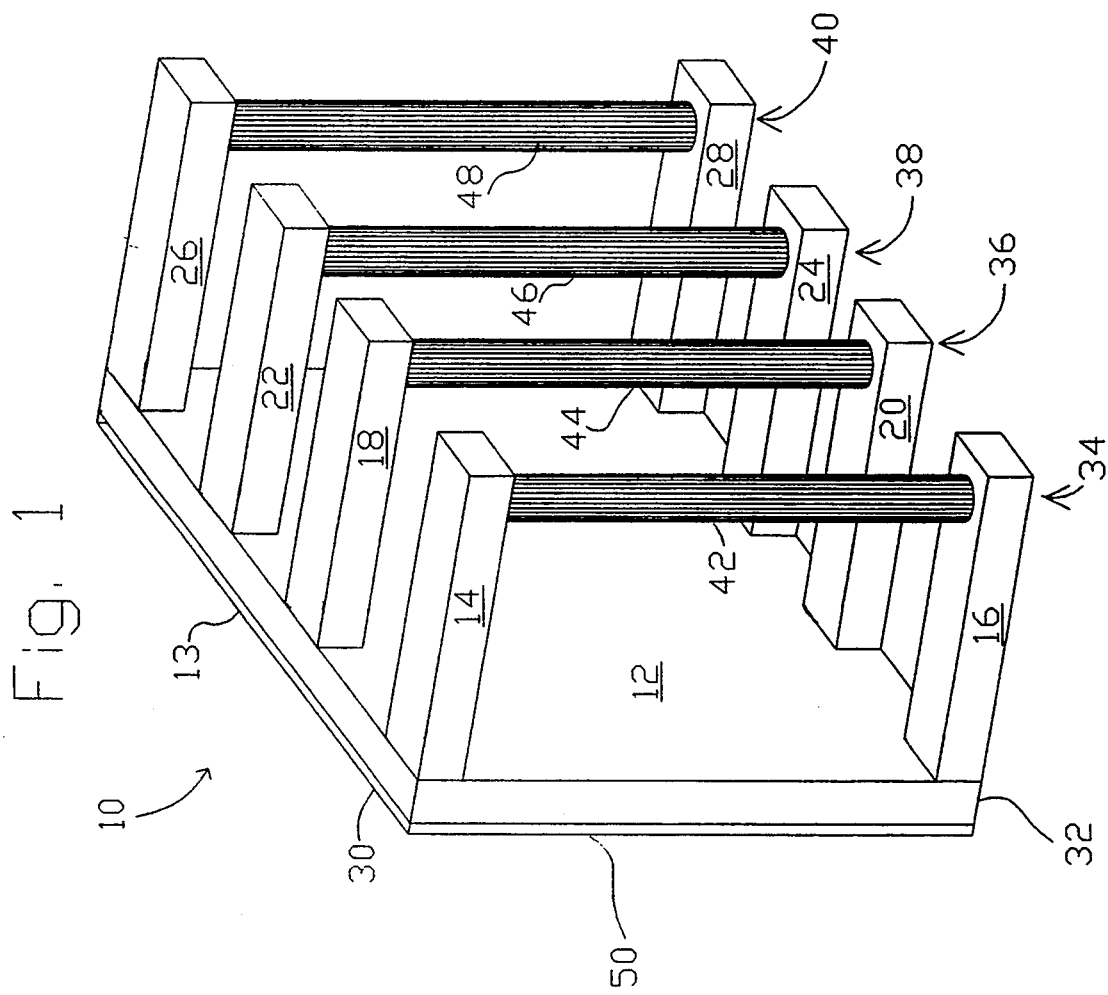
FIG. 1 is a diagrammatic perspective view of an improved laser correction mirror according to the present invention.

The best presently known mode for carrying out the invention is an improved laser correcting mirror using internal bending apparatus. The predominant expected usage of the improved laser correcting mirror of the present invention is as a substitute for prior art COMA correction devices.

An improved laser correcting mirror is shown in a diagrammatic perspective view in FIG. 1, and is designated therein by the general reference character 10. In the best presently known embodiment 10 of the present invention a mirror body 12 is a generally rectangular mirror having a light reflective surface 13 (only the edge of which is visible in the view of FIG. 1), the mirror body 12 being resiliently bendable to a limited extent. The mirror body 12 has a first leg 14, a second leg 16, a third leg 28, a fourth leg 20, a fifth leg 22, a sixth leg 24, a seventh leg 26 and an eighth leg 28. The legs 14, 16, 18, 20, 22, 24, 26 and 28 are arranged with the first leg 14, the third leg 18, the fifth leg 22 and the seventh leg 26 equally spaced along a first long side 30 of the mirror body 12, while the second leg 16, the fourth leg 20, the sixth leg 24 and the eighth leg 28 are similarly equally spaced along a second long side 32 of the mirror body 12, the second long side 34 being the side opposite the first long side 32 on the mirror body 12. As can be seen in the view of FIG. 1, the legs 14, 16, 18, 20, 22, 24, 26 and 28 are further arranged into opposed pairs such that the first leg 14 and the second leg 16 are a second leg pair 34, the third leg 18 and the fourth leg 20 are a second leg pair 36, the fifth leg 22 and the sixth leg 24 are a third leg pair 38, and the seventh leg 26 and the eighth leg 28 are a fourth leg pair 40.

The legs 14, 16, 18, 20, 22, 24, 26 and 28 are rigidly affixed to the mirror body 12 such that forces applied to the legs 14, 16, 18, 20, 22, 24, 26 and 28 will be transferred to the mirror body 12 and will tend to distort the mirror body 12 along with the light reflective surface 13 thereof. A first adjustment mechanism 42 is associated with the first leg pair 34 for applying forces thereto. In like manner, a second adjustment mechanism 44 is associated with the second leg pair 36, a third adjustment mechanism 46 is associated with the third leg pair 38 and a fourth adjustment mechanism 48 is associated with the fourth leg pair 40.

In the best presently known embodiment be of the present invention, the adjustment mechanisms 42, 44, 46 and 48 are essentially like the mechanisms referred to as the quadratic adjustment mechanisms of U.S. Pat. No. 4,664,488 issued to the present inventor and William Sweatt. Of course, at the time of the disclosure of the invention of the '488 Patent, it was believed that these mechanisms were appropriately named, since it was not within the scope of that invention to provide cubic forces by means of the "quadratic adjustment mechanisms". A distinguishing feature of the "quadratic adjustment mechanisms" of the '488 Patent and of the adjustment mechanisms 42, 44, 46 and 48 of the best presently known embodiment 10 of the present invention is that force is applied relative to and between the leg pairs (36, 34, 38 and 40, in the case of the best presently known embodiment be of the present invention) only, and no force is applied thereby to the mirror body 12 relative to any external reference. Since the adjustment mechanisms 42, 44, 46 and 48 have been fully described in the '488 Patent, they are shown in the view of FIG. 1 in representative diagrammatic form only for the sake of clarity, and only their different application according to the inventive method and means will be described in detail herein. It should be noted that, since the best presently known embodiment 10 of the present invention specifically does not rely on any special attachment to its surroundings and no forces are applied between the mirror body and its surroundings, no special mounting is required and any mirror mounting (not shown) which will hold the improved laser correction mirror 10 in place may be employed for the purpose.

FIG. 2 is a rear elevational view of the improved laser correction mirror be with the adjustment mechanisms 42, 44, 46 and 48 (FIG. 1) removed to better illustrate the forces to be applied by the adjustment mechanisms 42, 44, 46 and 48 according to the present inventive method. In the example of the best presently known embodiment 10 of the present invention, a first vector force pair 49 is applied between the first leg 14 and the second leg 16, a second vector force pair 50 is applied between the third leg 18 and the fourth leg 20, a third vector force pair 52 is applied between the fifth leg 22 and the sixth leg 24, and a fourth vector force pair 54 is applied between the seventh leg 26 and the eighth leg 28. As discussed previously, herein, since the vector forces 49, 50, 52 and 54 are applied by the adjustment mechanisms 42, 44, 46 and 48 (FIG. 1) strictly between the opposing pairs 34, 36, 38 and 40 of the legs 14, 16, 18, 20, 22, 24, 26 and 28, the vector forces 49, 50, 52 and 54 are equal and opposite as to each member of each of the opposing pairs 34, 36, 38 and 40. It should be noted that the present inventive method may be practiced in combination with other mirror bending methods such that additional legs (not shown) may be attached to the mirror body 12 in addition to the legs 14, 16, 18, 20, 22, 24, 26 and 28 shown on the best presently known embodiment 10 of the present invention. Such additional legs (not shown) could be used for applying additional bending forces to the mirror body 12 not related to the present invention.

FIG. 3 is a cross sectional view of the improved laser correction mirror 10, taken along line 3—3 of FIG. 2. In the view of FIG. 3 it can be seen that the mirror body 12 is bent into a concave configuration by the fourth vector force pair 54 at the fourth leg pair 40 due to the fact that the fourth vector force pair 54 is such that the fourth leg pair tends to be forced apart. It should be noted that in all of the figures of the drawing, herein, where bending of the mirror body 12 is depicted, such bending is exaggerated to better illustrate the present inventive method.

FIG. 4 is a cross sectional view of the improved laser correction mirror 10, taken along line 4—4 of FIG. 2. In the view of FIG. 4 it can be seen that the mirror body 12 is bent into a form at the third leg pair 38 which is somewhat less concave than that depicted in the view of FIG. 3 as being the cross section of the correction mirror 10 at the fourth leg pair 40. It can be recognized that, even if the fourth vector force pair 54 were providing the only bending force to the mirror body 12, then the shape of the mirror body 12 at the third leg pair 38 would be less concave than that of the mirror body 12 at the fourth leg pair 40. However, it should also be noted that the third vector force pair 52 is opposite in direction as compared to the fourth vector force pair 54; that is, the third vector force pair 52 is such that the members of the third leg pair 38 tend to be pulled together, although the third vector force pair 52 is lesser in magnitude than the fourth vector force pair 54.

FIG. 5 is a cross sectional view of the improved laser correction mirror 10, taken along line 5—5 of FIG. 2. It should be noted that line 5—5 of FIG. 2 is generally midway between a first short side 56 of the mirror body 12 and a second short side 58 of the mirror body 12. As can be seen in the view of FIG. 5, the cross section of the mirror body 12 taken at line 5—5 of FIG. 2 is generally flat.

FIG. 6 is a cross sectional view of the improved laser correction mirror 10, taken along line 6—6 of FIG. 2. As can be seen in the view of FIG. 6, the mirror body 12 at the second leg pair 36 is somewhat convex, generally to a degree comparable to the concave form of the mirror body 12 at the third leg pair 38 (FIG. 4). The second vector force pair 50 is generally equal in magnitude and opposite in direction (tending to push the members of the second leg pair 36 apart) as compared to the third vector force pair 52 (FIG. 4).

FIG. 7 is a cross sectional view of the improved laser correction mirror 10, taken along line 7—7 of FIG. 2. As can be seen in the view of FIG. 7, the mirror body 12 at the first leg pair 34 is convex, generally to a degree comparable to the concave form of the mirror body 12 at the fourth leg pair 40 (FIG. 3). The first vector force pair 49 is generally equal in magnitude and opposite in direction (tending to pull the members of the first leg pair 34 together) as compared to the fourth vector force pair 54 (FIG. 3).

FIG. 8 is a front elevational view of the improved laser correction mirror 10 in which only the light reflective surface 13 is visible. In the view of FIG. 8, superimposed on the light reflective surface 13 are an X axis 60, a Y axis 62, a Z axis indicator 64, an A—A reference line 66, a B—B reference line 68, a C—C reference line 70, a D—D reference line 72 and an E—E reference line 74. The axis indicators 62, 64 and 66 and the reference lines 66, 68, 70, 72 and 74 are shown for reference purposes only on the drawing of FIG. 8, and they are not actually manifested on the best presently known embodiment 10 of the invention. The X axis 60 and the Y axis 62 are conventional axis lines intersecting generally at the center of the light reflective surface 13. The Z axis represents displacement of the light reflective surface 13 in a plane perpendicular to the plane of intersection of the X axis 60 and the Y axis 62 with a positive displacement emerging from the light reflective surface 13 toward the viewer. The reference lines 66, 68, 70, 72 and 74 are equidistant lines parallel to the long sides 30 and 32 of the mirror body 12 (FIG. 1), and the C—C reference line 70 coincides with the Y axis 62.

According to the present inventive method, the best presently known embodiment 10 of the present invention can be distorted such that light reflective surface 13 is distorted according to a COMA function by application of the vector force pairs 49, 50, 52 and 54 to the opposing pairs 34, 36, 38 and 40 of the legs 14, 16, 18, 20, respectively. One example of COMA distortion (described by a cubic function) is distortion described by the equation:

$$Z = A\ Y^3 + B\ X^2 Y$$

where A and B are constants determined by the physical properties of the cause of the COMA distortion and X, Y and Z are the displacement along the X axis 60, the Y axis 62 and the Z axis 64, respectively.

FIG. 9 is a graphic representation of an example of the flexing of the light reflective surface 13 required to correct for COMA. FIG. 9 depicts the reference lines 66, 68, 70, 72 and 74 of FIG. 8 in respect to the Z axis 64 and the Y axis 62. As can be appreciated from the view of FIG. 8, each of the reference lines 66, 68, 70, 72 and 74 is drawn to represent a constant distance from the X axis 60. As can be seen in the graph of FIG. 9, the A—A reference line 66 is coincident along its length with the E—E reference line 74, and the B—B reference line 68 is coincident along its length with the D—D reference line 72. Therefore, the curvature of the mirrored surface 13 can be seen to be symmetrical about the Y axis 70 at any cross section taken parallel to the X axis 60 (such as those depicted in the views of FIGS. 3, 4, 5, 6 and 7) when the vector force pairs 49, 50, 52 and 54 are applied to the leg pairs 34, 36, 38 and 40, as described herein.

Various modifications may be made to the invention without altering its value or scope. The direction and magnitude of the vector force pairs 49, 50, 52 and 54 shown and described herein are exemplary only, and it can be appreciated that adjustment mechanisms 42, 44, 46 and 48 may be utilized to vary the vector force pairs 49, 50, 52 and 54 to accommodate the requirements of a particular COMA distortion factor. As discussed previously, herein, the configuration of the best presently known embodiment 10 of the present invention might also be varied to accommodate the correction of distortion factors other than COMA, and this might be accomplished by adding additional legs (not shown) and associated mechanisms. Such a modification might entail using the present leg pairs 34, 36, 38 and 40 in conjunction with any additionally provided legs (not shown).

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The improved laser correction mirror 10 is intended to replace conventional COMA correction devices in laser transport optics. As discussed previously, herein, the inventor has found that the present inventive method using the best presently known embodiment 10 of the present invention will provide an accurately defined COMA correction factor, and will do so using fewer components and with less cost than was contemplated in the prior art. Furthermore, since no forces are applied to the mirror body 12 relative to any position external to the improved laser correction mirror 10 in order to produce deformation of the light reflective surface 13 into a shape described by a cubic function, no inadvertent unwanted distortion of the light reflective surface 13 is produced as a result.

The aspect ratio (the ratio of the long sides 30 and 32 to the short sides 56 and 58 of the mirror body 12) is not critical to the invention, nor is the physical resiliency of the mirror body 12 critical, provided that the mirror body 12 is sufficiently resilient to bend as required for the specific shape and size of the laser beam that is being corrected and sufficiently rigid to provide significant resistance to the vector forces 49, 50, 52 and 54. While the legs 14, 16, 18, 20, 22, 24, 26 and 28 are equally spaced along the long sides 30 and 32 of the mirror body 12 in the best presently known embodiment 10 of the present invention, the inventor has found that alternative spacing may produce a similar result if the vector forces 49, 50, 52 and 54 are altered accordingly. One skilled in the art should be able to adjust the placement of the legs 14, 16, 18, 20, 22, 24, 26 and 28 and the magnitude of the vector forces 49, 50, 52 and 54 to meet the needs of a particular application, with a particular mirror body 12 and COMA distortion factor to which the mirror body 12 must be conformed, with only a minimal amount of experimentation. Since mathematical modeling software is commonly available to practitioners in the relevant field, those skilled in the art will probably wish to determine these factors by computer modeling, according to the needs of the particular application, prior to attempting a physical embodiment of the invention. The inventor has found that, having achieved the present inventive configuration having the four leg pairs 34, 36, 38 and 40 placed, as described herein, along the long sides 30 and 32 of the mirror body, and recognizing that the vector force pairs 49, 50, 52 and 54 applied thereto as further described herein, one skilled in the art can readily modify the best presently known embodiment 10 of the present invention to meet many of the various situational requirements which are presented for COMA correction.

The inventor has found that only approximately one half (the central portion) of the light reflective surface 13 may consistently reliably conform to an optimal COMA correcting function, and it is therefore desirable that the light reflective surface 13 be made significantly larger than the laser beam wave front for which the particular application of the improved laser correction mirror 10 is intended.

The improved laser correction mirror 10 may be utilized in any application wherein conventional COMA correction factor devices are used, and will provide an accurate correction factor without introducing any additional unwanted distortion factors. Therefore, it is expected that it will be acceptable in the field as a substitute for the conventional COMA correction devices. For these and other reasons, it is expected that the utility and industrial applicability of the invention will be both significant in scope and long-lasting in duration.

I claim:

1. An apparatus for correcting wavefront distortion in a laser beam, comprising:
    a generally rectangular mirror body, a front surface thereof being a light reflecting surface, the mirror body being resiliently bendable, to a limited extent;
    a plurality of leg devices projecting rearwardly from said mirror body, said leg devices being attached to the mirror body such that bending forces can be applied to the mirror body therethrough, the bending forces being such that the light reflecting surface is distorted thereby; and
    a plurality of adjustment mechanisms for applying the bending forces between opposing of leg devices, wherein;
    said light reflecting surface is bent into a shape defined by a cubic function by the application of the bending forces to said plurality of leg devices.

2. The apparatus of claim 1, wherein:
    the number of said leg devices is eight; and
    said leg devices are arranged in pairs with four of said leg devices being positioned along each of the two long sides of said mirror body and, further, with the two members of each pair of the leg devices being opposed from its opposite member across the width of said mirror body.

3. The apparatus of claim 2, wherein:
    the four of said leg devices which are positioned along each of the two long sides of said mirror body are equally spaced along that side.

4. The apparatus of claim 2, wherein:
    said adjustment mechanisms are attached to said leg devices such that equal and opposite vector forces are applied to each member of each of the pairs of said leg devices relative to the opposite member of the pair.

5. The apparatus of claim 2, wherein:
    the bending forces are applied to the pairs of said leg devices such that successive iterations of the pairs of said leg devices tend alternately to be forced apart and pulled together.

6. The apparatus of claim 2, wherein:
the bending forces are applied to the pairs of said leg devices such that, beginning at an end of said mirror body defined by a first short side of said mirror body, a first pair of said leg devices tends to be pulled together, a second pair of said leg devices tends to be pushed apart, a third pair of said leg devices tends to be pulled together and a fourth pair of said leg devices tends to be pushed apart.

7. The apparatus of claim 6, wherein:
those vector forces acting on the first and fourth pair of said leg devices are greater in magnitude than are those vector forces acting on the second and third pair of said leg devices.

8. The apparatus of claim 6, wherein:
those vector forces acting on the first pair of said leg devices are equal in magnitude and opposite in direction to those vector forces acting on the fourth pair of said leg devices; and
those vector forces acting on the second pair of said leg devices are equal in magnitude and opposite in direction to those vector forces acting on the third pair of said leg devices.

9. The apparatus of claim 8, wherein:
those vector forces acting on the first pair of said leg devices are opposite in direction to those vector forces acting on the second pair of said leg devices.

10. The apparatus of claim 9, wherein:
those vector forces acting on the first pair of said leg devices are greater in magnitude than those vector forces acting on the second pair of said leg devices.

11. A method for bending a laser correction mirror into a shape defined by a cubic function, comprising:
affixing a plurality of leg devices to the mirror such that the mirror can be bent by applying forces to said leg devices, said leg devices being arranged in a plurality of opposing leg pairs such that each of the leg pairs has one of said leg devices positioned along each of the two long sides of the mirror; and
applying forces to said leg devices relative to other members of said leg devices.

12. The method of claim 11, wherein:
forces are applied between the two of said leg devices which comprise each of the leg pairs.

13. The method of claim 11, wherein:
the number of the leg pairs is four; and
vector forces are applied such that a first of said leg pairs tends to be pulled together, a second of said leg pairs tends to be pushed apart, a third of said leg pairs tends to be pulled together and a fourth of said leg pairs tends to be pushed apart.

14. The method of claim 13, wherein:
the leg pairs are arranged sequentially along the length of the mirror with the first leg pair preceding the second leg pair, the second leg pair preceding the third leg pair, and the third leg pair preceding the fourth leg pair.

15. A method for correcting COMA in a laser beam, comprising:
reflecting the laser beam from a reflective surface of a flexible mirror, the mirror having eight legs projecting generally perpendicularly therefrom and arranged such that four legs are positioned along a first side of the mirror and the remaining four legs are positioned along a second side of the mirror, the second side of the mirror being opposed across the width of the mirror from the first side, the eight legs further being arranged such that there are, sequentially, a first pair, a second pair, a third pair and a fourth pair with each of the two members of each pair of legs being directly opposed across the width of the mirror from the corresponding leg member, the legs being affixed to the mirror such that the mirror can be flexed by applying force to any of the legs relative to any of the other legs; and
applying force to the legs such that the first pair tends to be forced apart, the second pair tends to be pulled together, the third pair tends to be forced apart and the fourth pair tends to be pulled together.

16. The method of claim 15, wherein:
the force applied to the second pair of legs is generally equal in magnitude and opposite in direction as compared to the force applied to the third pair of legs;
the force applied to the first pair of legs is generally equal in magnitude and opposite in direction as compared to the force applied to the fourth pair of legs; and
the force applied to the second pair of legs lesser in magnitude and opposite in direction as compared to the force applied to the first pair of legs.

17. The method of claim 15, wherein:
the legs project rearwardly from the a side of the mirror, the back side being the side opposite the reflective surface of the mirror; and
the force is applied to the legs at some distance along the legs from the mirror such that applying force to the legs relative to other of the legs tends to deform the reflective surface of the mirror.

* * * * *